(12) United States Patent
Tseng

(10) Patent No.: US 6,348,254 B1
(45) Date of Patent: Feb. 19, 2002

(54) REFLECTIVE PAD AND ITS PATTERN FORMATION PROCESS

(75) Inventor: Tony Tseng, Chang Hua Hsien (TW)

(73) Assignee: Taiwan Paiho Limited, Chang Hua Hsien (TW)

( * ) Notice: Subject to any disclaimer, the term of this patent is extended or adjusted under 35 U.S.C. 154(b) by 0 days.

(21) Appl. No.: 09/759,418

(22) Filed: Jan. 12, 2001

(51) Int. Cl.⁷ ................ D06N 7/04; B32B 5/16
(52) U.S. Cl. ............ 428/143; 428/149; 428/206; 428/323; 428/913.3
(58) Field of Search ................ 428/195, 913, 428/913.3, 143, 149, 323, 206

(56) References Cited

U.S. PATENT DOCUMENTS

| | | | | |
|---|---|---|---|---|
| 4,102,562 A | * | 7/1978 | Harper et al. | 428/323 |
| 4,103,053 A | * | 7/1978 | Barehas | 428/323 |
| 4,755,407 A | * | 7/1988 | Mortensen et al. | 428/143 |
| 5,236,751 A | * | 8/1993 | Martin et al. | 428/141 |
| 5,620,775 A | * | 4/1997 | LaPerre | 428/143 |
| 5,624,731 A | * | 4/1997 | Desjardins | 428/143 |
| 5,631,064 A | * | 5/1997 | Marecki | 428/143 |
| 5,837,347 A | * | 11/1998 | Marecki | 428/143 |
| 6,066,384 A | * | 5/2000 | Crandall | 428/143 |

* cited by examiner

Primary Examiner—Cathy Lam
(74) Attorney, Agent, or Firm—Pro-Techtor International Services

(57) ABSTRACT

A reflective pad formed of a bottom fabric base layer, a top glass bead layer and an intermediate metal coating layer and treaded with a laser beam to present a first pattern that can be seen from different angles, a second pattern that is seen at a first particular angle, and a third pattern that is seen at a second particular angle.

6 Claims, 4 Drawing Sheets

REFLECTIVE PAD AND ITS PATTERN FORMATION PROCESS

BACKGROUND OF THE INVENTION

The present invention relates to a reflective pad and its pattern formation process, in which a laser beam is applied to the metal coating layer of the glass bead layer of the reflective pad to form a non-polarized pattern on the metal coating layer and two differently polarized patterns on the glass beads of the glass bead layer.

Regular sports wear and sports shoes may be stitched with reflective pads showing the trade name or logo of the suppliers. FIGS. 1 and 2 show a reflective pad for this purpose. As illustrated, the reflective pad comprises a fabric base layer 10, a metal coating layer, for example, an aluminum coating 11 coated on the fabric base layer 10 by a vacuum electroplating process, and a layer of glass beads 15 adhered to the aluminum coating 11, and a pattern (for example, the trade name or logo of the supplier) 16 screen-printed on the glass beads of the layer of glass beads 15. Because the pattern 16 is screen-printed on the glass beads of the layer of glass beads 15, it is monotonous and less attractive. Further, because the pattern 16 is a printed matter, it wears quickly with use.

SUMMARY OF THE INVENTION

The present invention has been accomplished under the circumstances in view. It is the main object of the present invention to provide a reflective pad, which provides a variation when viewed from different angles. It is another object of the present invention to provide a reflective pad, which provides a wear-resisting pattern. According to the present invention, the reflective pad comprises a fabric base layer, a metal coating layer covered on the fabric base layer, a glass bead layer formed of a plurality of glass beads and adhered to the metal coating layer, sintered surface portions formed on the metal coating layer and showing a non-polarized pattern that can be seen from different angles, first frosted surface portions formed on the glass beads of the glass bead layer and showing a first polarized pattern that can be seen only from the front side of the reflective pad, and second frosted surface portions formed on the glass beads of the glass bead layer and showing a second polarized pattern that can be seen only from a particular angle. The pattern formation process of is to apply a laser beam of frequency within about 2.5 Hz~10 Hz and energy within 500 A~800 A at the speed of 200~800 s/sec to said aluminum coating layer and different locations of the glass beads of the glass bead layer to form sintered surface portions on the aluminum coating layer, first frosted surface portions on the glass beads of the glass bead layer at a bottom side, and second frosted surface portions on the glass beads of the glass bead layer at one lateral side.

DETAILED DESCRIPTION OF THE PREFERRED EMBODIMENT

Figure 2:
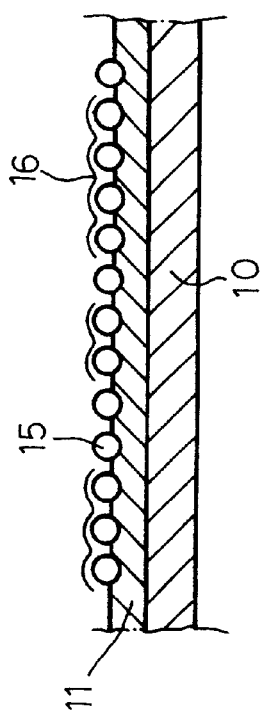
FIG. 2 is a sectional view showing the structure of the prior art reflective pad.
Figure 1:
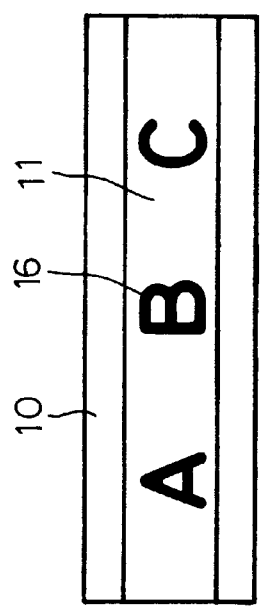
FIG. 1 illustrates the outer appearance of a reflective pad according to the prior art.
Figure 4:
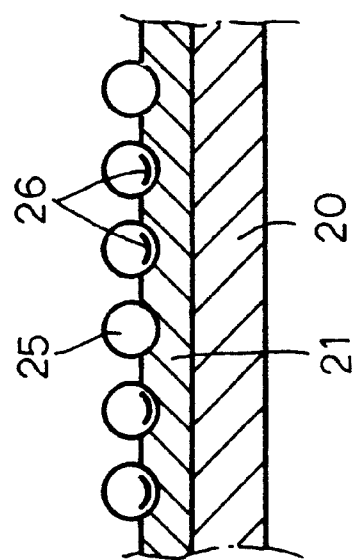
FIG. 4 is a sectional view of another reflective pad according to the present invention.
Figure 3:
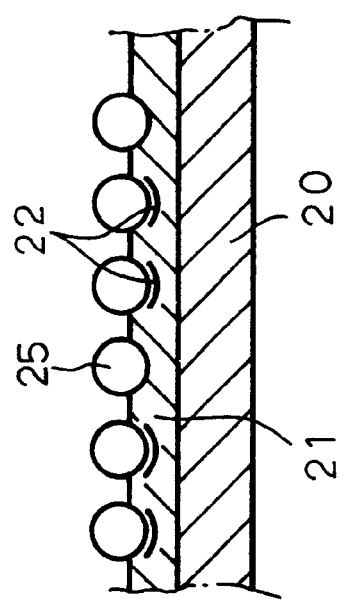
FIG. 3 is a sectional view of a reflective pad according to the present invention.
Figure 5:
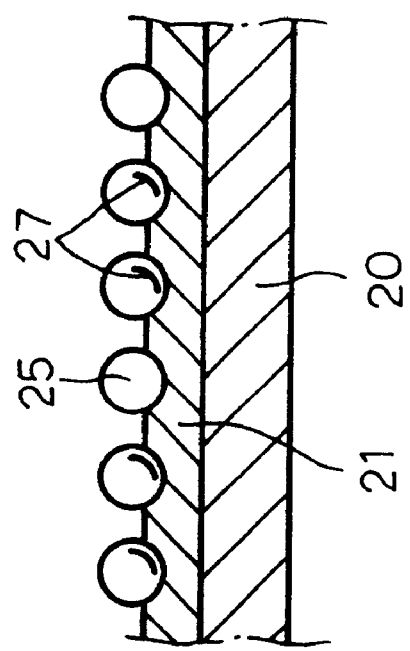
FIG. 5 is a sectional view of still another reflective pad according to the present invention.

Referring to FIG. 3, a reflective pad is shown comprising a fabric base layer 20, a metal coating layer, for example, an aluminum coating layer 21 coated on the fabric base layer 20 by a vacuum electroplating process, and a glass bead layer 25 adhered to the aluminum coating layer 21.

Referring to FIG. 3 again, a laser beam of frequency within about 2.5 Hz~10 Hz and energy within 500 A~800 A is applied to the aluminum coating layer 21 at the speed of 200~800 s/sec, forming sintered surface portions 22 of relatively darker color on the aluminum coating layer 21 subject to the desired pattern.

Figure 6:
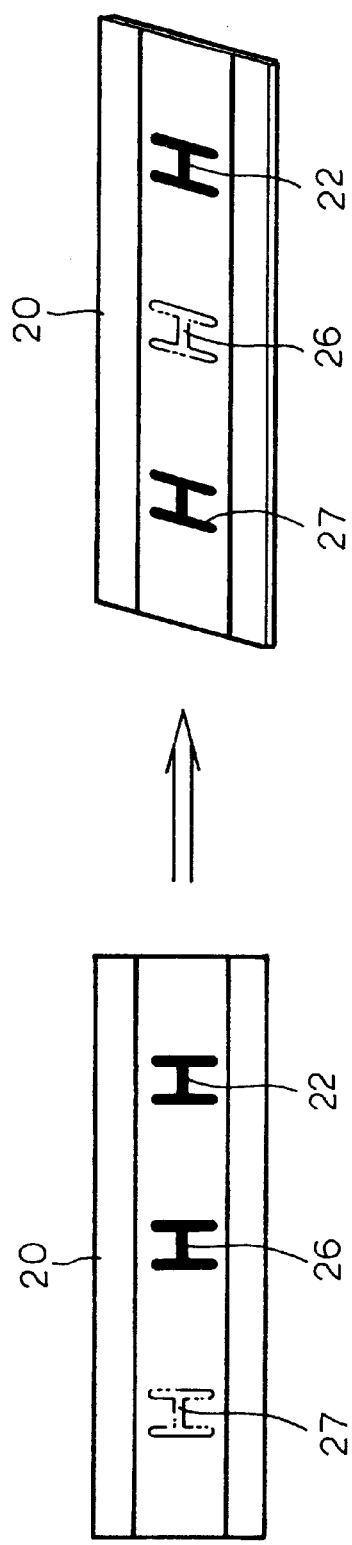
FIG. 6 is a schematic drawing showing the patterns of the sintered surface portion, the first frosted surface portions and the second frosted surface portions are respectively viewed at different angles.

Referring to FIGS. from 4 through 6, when the laser beam is focused on the bottom side of the glass bead layer 25, first frosted surface portions 26 are respectively formed on the beads of the glass bead layer 25 at the bottom side, and second frosted surface portions 27 are respectively formed on the beads of the glass bead layer 25 at one lateral side. The first frosted surface portions 26 and the second frosted surface portions 27 form a respective polarized pattern. Therefore, when viewing obliquely from one side, the pattern of the second frosted surface portions 27 on the glass bead layer 25 is seen, however the pattern of the first frosted surface portions 26 is kept from sight, and on the contrary, when viewing from the front side, the pattern of the first frosted surface portions 26 is seen, and the pattern of the second frosted surface portions 27 is kept from sight (see FIG. 6).

Referring to FIG. 6 again, the sintered surface portions 22, the first frosted surface portions 26, and the second frosted surface portions 27 show the same pattern. However, the pattern of the sintered surface portions 22 and the pattern of the first frosted surface portions 26 are seen and the pattern of the second frosted surface portions 27 is kept from sight when viewed from the front side; the pattern of the sintered surface portions 22 and the pattern of the second frosted surface portions 27 are seen and the pattern of the first frost surface portions 26 is kept from sight when viewed obliquely from one side.

As indicated above, by means of controlling the application conditions of the laser beam to the glass bead layer 25 and/or the aluminum coating layer 21, sintered surface portions 22 and different frosted surface portions 26 and 27 are respectively formed on the aluminum coating layer 21 and the glass bead layer 25, and the pattern of the first frosted surface portions 26 and the pattern of the second frosted surface portions 27 are respectively polarized at a respective particular angle. Because the frosted surface portions 22 and 26 and the frosted surface portions 27 are respectively polarized, they can be seen only at a respective particular angle.

While only one embodiment of the present invention has been shown and described, it will be understood that various modifications and changes could be made thereunto without departing from the spirit and scope of the invention disclosed.

What the invention claimed is:

1. A pattern formation process of processing a pattern on a reflective pad comprising a fabric base layer, a metal coating layer covered on said fabric base layer and a glass bead layer formed of a plurality of glass beads and adhered to said metal coating layer, the pattern forming process comprising the step of applying a laser beam of frequency within about 2.5 Hz~10 Hz and energy within 500 A~800 A at the speed of 200~800 s/sec to said aluminum coating layer and different locations of the glass beads of said glass bead layer to form sintered surface portions on said aluminum coating layer, first frosted surface portions on said glass beads of said glass bead layer at a bottom side, and second frosted surface portions on said glass beads of said glass bead layer at one lateral side.

2. The pattern formation process of claim 1, wherein said metal coating layer is an aluminum coating electroplated on said fabric base layer by a vacuum electroplating process.

3. A reflective pad comprising a fabric base layer, a metal coating layer covered on said fabric base layer, a glass bead layer formed of a plurality of glass beads and adhered to said metal coating layer, sintered surface portions formed on said metal coating layer and showing a pattern, first frosted surface portions formed on the glass beads of said glass bead layer and showing a first polarized pattern, and second frosted surface portions formed on the glass beads of said glass bead layer and showing a second polarized pattern.

4. The reflective pad of claim 3, wherein said sintered surface portions show a non-polarized pattern.

5. The reflective pad of claim 3, wherein said first frosted surface portions of said first polarized pattern are formed on the glass beads of said glass bead layer at a bottom side and seen when viewing the reflective pad from the front side.

6. The reflective pad of claim 3, wherein said second frosted surface portions of said second polarized pattern are formed on the glass beads of said glass bead layer at one lateral side and seen when viewing the reflective pad obliquely from one side.

* * * * *